Dec. 25, 1934.  J. H. VICTOR  1,985,475

GASKET

Filed Nov. 29, 1932

INVENTOR
John H. Victor
BY Wm. O. Bell
ATTORNEY

Patented Dec. 25, 1934

1,985,475

UNITED STATES PATENT OFFICE 1,985,475

GASKET

John H. Victor, Evanston, Ill., assignor to Victor Manufacturing & Gasket Company, Chicago, Ill., a corporation of Illinois Application November 29, 1932, Serial No. 644,894

1 Claim. (Cl. 288—1)

This invention relates to gaskets and it is particularly useful in gaskets for spark plugs.

The primary object of the invention is to provide a cushion gasket capable of resisting the pressure of high compression internal combustion engines and which may be compressed sufficiently to form an effective seal without completely crushing it and destroying its cushion effect and without the exercise of such a degree of force as may tend to distort the gasket and destroy its effectiveness as a seal.

Another object of the invention is to provide a cushion gasket which can be manufactured in standard size and shape to provide a uniformly effective seal under varying conditions of the joint to be sealed.

Another object is to provide a cushion gasket which will readily adapt itself to the faces of the joint to which it is applied and form an effective seal under less pressure than would be required for maximum compression so that the sealing effect may be obtained over a comparatively wide range of compression.

And a further object of the invention is to provide a strong and substantial cushion gasket having a steel shell which enables the gasket to resist the pressure of high compression internal combustion engines and which is protected from deterioration by a copper covering.

In the accompanying drawing I have illustrated the invention in a spark plug gasket as a selected embodiment and referring thereto, Fig. 1 is a plan view of the gasket.

Figure 1:
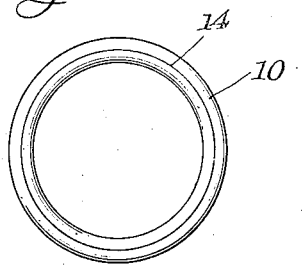
Figure 2:
Fig. 2 is an edge view.
Figure 3:
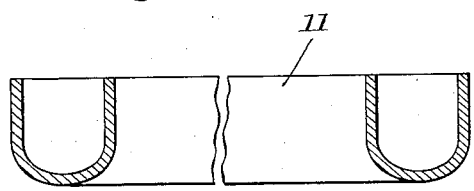
Fig. 3 is an enlarged sectional view illustrating one step in the formation of the outer shell or covering.
Figure 4:
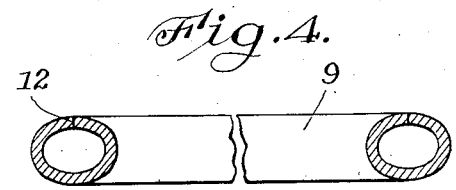
Fig. 4 is a similar view of the inner shell completely formed.
Figure 5:
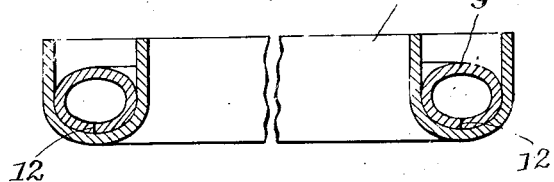
Fig. 5 is also an enlarged sectional view showing the inner shell arranged in the partly formed outer covering.

Referring to the drawing, the gasket comprises an inner shell 9 and an outer covering 10 which is also made in the form of a shell. An annular blank is formed into an annular grooved member 11, Fig. 3, U-shaped in cross section to receive the tubular shell or core. An annular blank is bent to form the tubular inner shell with its edges 12 abutting on one side of the shell, Fig. 4. The inner shell is arranged in the groove of the member 11 and the edge portions of this member are folded over snugly upon the inner shell with the abutting edges 14 of the covering shell located at the opposite side of the gasket from the abutting edges 12 of the inner shell, Fig. 6.

Figure 6:
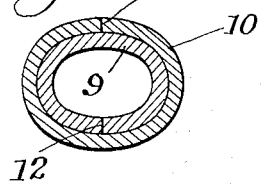
Fig. 6 is a sectional view of the completed gasket.
Figure 7:
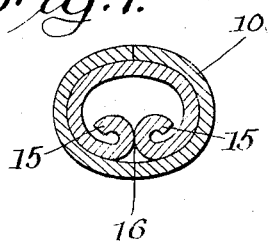
Figs. 7 and 8 are sectional views illustrating modified forms of the gasket.
Figure 8:
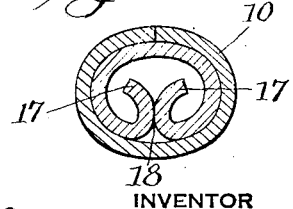

Instead of making the edges of the inner shell abut as in Fig. 6, they may be beaded as at 15, and abutted as at 16, Fig. 7; or the edge portions 17 of the inner shell may be bent inwardly and away from each other and abutted at 18, Fig. 8. In the construction of Fig. 6 there will be four layers of metal when the gasket is compressed or crushed; in the construction of Fig. 7 there will be five layers of metal when the gasket is crushed because the beads will spread out and flatten within the inner shell; and in the construction of Fig. 8 there will also be five layers of metal when the gasket is crushed because the edge portions 17 will fold or bend outwardly when the gasket is crushed.

The inner shell is preferably made of steel and the outer covering or shell of copper. The inner shell is a tubular ring and the outer covering completely encloses the inner shell to protect it from rust or other deterioration. The inner shell provides the strength and rigidity desired for the gasket and the outer shell provides a protective covering for the inner shell and also enables the gasket to readily adapt itself to slight imperfections and irregularities of the faces of the joint to which the gasket is applied. While I prefer to make the inner shell of steel and the outer covering of copper, I may substitute other metals which will give the same or substantially equivalent results. In all constructions the inner shell provides a cushion for the gasket by reason of the strength of the metal, and the confined air within the tubular inner shell. The abutting edges of the inner shell and covering shell, Fig. 6, have the effect of holding the shells in shape and preventing them and the gasket from becoming distorted under the screwing effect of a spark plug or other part, or under pressure of other kind, and preserving a cushion condition until the gasekt is flattened. The same is true of the construction of Figs. 7 and 8 because the curved portions 16 and 18 abut in the same manner as the edges 12 of Fig. 6 abut except that these curved edges promote the tendency of the beads and the inturned edges to fold outwardly and conform to the general shape of the gasket under compression and crushing pressure to provide a gasket which will maintain a cushion effect until the gasket is completely flattened.

When the gasket is applied at the joint between a spark plug and the head of an internal combustion engine, sufficient screw pressure is employed on the spark plug to compress the gasket to form a seal. The steel shell will resist the spark plug pressure and permit compression of the gasket without any material crushing or collapsing under considerable pressure, and then the crushing or collapsing action will begin and gradually increase without material increase in pressure. This does not destroy the cushion effect of the gasket because it is not completely crushed or collapsed and hence it will continue to provide for the usual expansion and contraction which takes place at the joint in an internal combustion engine without affecting the seal.

The seal may be effected during the initial compression of the gasket or during the progressive crushing or collapsing action and some time before the gasket is completely crushed or collapsed and flattened, depending upon different conditions and different uses. When a gasket embodying the invention is employed with a spark plug the plug can be set and the gasket compressed sufficiently to effect a seal with very little if any real crushing or collapsing of the gasket and, since this crushing or collapsing action may take place thereafter during a considerable inward movement of the spark plug and without material increase in pressure, there is a substantial range of movement of the spark plug during which the sealing effect is maintained before the gasket is substantially crushed or collapsed. The gasket not only forms a seal when the spark plug is screwed into initial set but it continues to form this seal without destructive crushing or collapsing if the spark plug is screwed in further, and this seal continues to be a cushion seal and will accommodate expansion and contraction of the engine head and spark plug under different heat conditions. After the gasket has been substantially crushed or collapsed, if the spark plug should be screwed in to produce this condition, the gasket is still capable of further compression under considerable additional pressure of the gasket before it is completely flattened to a solid mass and at any stage of this advanced movement of the spark plug the gasket will, of course, continue to form its seal but the cushion effect will be progressively reduced.

There is a distinct advantage in providing a gasket which will continue to form an effective seal during a considerable range of movement of a spark plug, for example, without destroying its cushion effect because this takes care of the human equation to a very material extent and provides a gasket which will serve properly when the spark plug is tightened light or tightened hard or any intermediary thereof; and even if extreme force is applied to the spark plug in tightening it the gasket will not be distorted and damaged beyond satisfactory usefulness.

In installing a spark plug, for example, it is the usual practice to screw it in until it reaches a substantially tight fit and forms a seal. It is not possible to provide a gauge which will accurately determine when the gasket is effecting a seal and hence it is the usual practice to give the spark plug some more turn to make sure that it is well seated. If the pressure applied is not sufficient the gasket will fail to hold the pressure of a high compression engine; if the pressure applied is too great the gasket may be distorted and fail to hold the pressure. It is not easy to tell how much pressure to apply to the spark plug especially for a high compression engine but my invention provides a gasket which will form a seal during a wide range of movement of the spark plug and always accommodate the expansion and contraction incident to heat conditions in the engine and spark plug.

I have shown and described the invention in forms adapted for spark plug gaskets but I do not restrict the invention to these forms or to this use and I reserve the right to make any changes in the commercial adaptation of the invention within the scope of the following claim.

I claim:

A gasket comprising an inner tubular annular shell formed from sheet metal with its marginal edges inturned and beaded and the beaded portions abutting and an outer tubular covering snugly enclosing said inner shell.

JOHN H. VICTOR.